United States Patent [19]

Ceintrey

[11] 3,953,390

[45] Apr. 27, 1976

[54] PROCESS FOR PREPARING A COMPOSITION FOR THE SURFACE OF ROADS, AIRPORT RUNWAYS AND LIKE SURFACES AND THE PRODUCTS OBTAINED

[75] Inventor: Marcel Ceintrey, Marly-le-Roi, France

[73] Assignee: Societe Chimique, Routiere et d'Entreprise Generale (S.C.R.E.G.), Paris, France

[22] Filed: May 6, 1974

[21] Appl. No.: 467,568

[30] Foreign Application Priority Data

May 10, 1973 France .............................. 73.16935

[52] U.S. Cl. ..................... 260/28.5 AS; 260/28.5 D
[51] Int. Cl.² ........................................ C08L 91/00
[58] Field of Search ................. 260/28.5 AS, 28.5 D

[56] References Cited
UNITED STATES PATENTS 3,549,575  12/1970  Payne et al. ................... 260/28.5 D
3,654,217  4/1972  Corri ............................. 260/28.5 D

FOREIGN PATENTS OR APPLICATIONS 1,383,140  1964  France ............................... 260/28.5
1,575,668  1969  France ............................... 260/28.5

*Primary Examiner*—M. J. Welsh
*Attorney, Agent, or Firm*—Wenderoth, Lind & Ponack

[57] ABSTRACT

Process for preparing a composition for the surface of roads, airport runways, canals, dams and the like surfaces, comprising mineral granulates coated with 4–12% by weight with respect to the weight of the granulates, of a binder consisting essentially of 93–96% by weight of fluxed coal pitch or fluxed coal tar and 4–7% by weight of a polymer or copolymer of vinyl chloride. The polymer or copolymer is first mixed rapidly in a mixer in the form of a powder with the granulates previously heated to a temperature of 120°–160°C and the binder is thereafter introduced in the mixer in contact with the mixture thus obtained and the mixing of the composition is terminated in the conventional manner.

5 Claims, No Drawings

PROCESS FOR PREPARING A COMPOSITION FOR THE SURFACE OF ROADS, AIRPORT RUNWAYS AND LIKE SURFACES AND THE PRODUCTS OBTAINED

The present invention relates to a process for preparing a composition for the surface of roads, airport runways, canals, dams and like surfaces comprising mineral granulates coated with a binder constituted by fluxed coal pitch or tar and a vinyl polymer, this binder being usually named "vinyl-tar" or "vinyl-pitch".

Processes for preparing coated products of this type have already been described. In the process described in French Pat. No. 1,383,140, a powder of vinyl polymer or copolymer is sprayed into the mixer of the coating station after the granulates have been coated with the fluxed pitch or tar.

This process is simple and cheap but has a serious drawback in that the polymer has a tendency to adhere to the blades and the walls of the mixer where, bearing in mind the temperature at these points, it gels and forms balls of rubbery nature which are found in the final coated product where they are most undesirable.

In order to overcome this drawback, it has been proposed in French Pat. No. 1,575,668 to first prepare at ambient temperature a suspension of the vinyl polymer in anthracenic oil and thereafter rapidly mix, just before effecting the coating, the suspension obtained with the fluxed pitch or tar heated to a temperature of about 140° to 170°C. The granulates are then coated with the binder thus obtained.

With this process, the harmful irreversible transformation of the binder in the course of the usual prolonged hot storage thereof and the formation of the aforementioned rubbery balls are avoided.

This process provides coated materials of excellent and constant quality but has the drawback of requiring for the preparation of the materials a large machine which is costly to transport from one site to the other.

An object of the present invention is to overcome the aforementioned drawbacks and to provide a simple and cheap process which is very easy to carry out with conventional equipment and in which any agglomeration of the polymer on the elements of the machine, such as the blades, walls etc. is avoided.

According to the invention, there is provided a process for preparing a composition for the surface of roads, airport runways, canals, dams and like surfaces, by mixing in a mixer mineral granulates with 4 to 12% by weight, with respect to the weight of the granulates, of a binder consisting essentially of 93 to 96% by weight of a first component selected from fluxed coal pitch and fluxed coal tar and 4 to 7% by weight of a second component selected from a polymer of vinyl chloride and a copolymer of vinyl chloride, the improvement consisting of (a) mixing first in 5–20 sec. said second component in the form of a powder having a particle size of less than 100 microns with the granulates previously heated to a temperature between 120° and 160°C, (b) thereafter introducing said first component in the mixer in contact with the mixture thus obtained, and (c) further mixing the composition, the total mixing time of steps (a) and (c) being of from 40 sec. to 90 sec.

Another object of the invention is to provide the surface compositions obtained by the aforementioned process.

Further features and advantages of the invention will be apparent from the ensuing description.

In the process according to the invention there is prepared a composition for the surface of roads, airport runways, canals, dams and like surfaces constituted by mineral granulates coated with a binder of the vinyl-pitch or vinyl-tar type, this binder being employed in a proportion of about 4–12% by weight with respect to the weight of the granulates.

The mineral granulates employed have a particle size usually less than 45 mm; they are mixtures of conventional type containing gravels of various particle sizes, sand and fillers.

The binder is constituted by 93–96% by weight of a tar or pitch fluxed with anthrasenic oil and 4–7% by weight of a polymer or copolymer of vinyl chloride.

The fluxed pitch or tar employed are conventional products well known in this technique. They preferably have an E.V.T. value of 30° to 60°.

By way of an example of a copolymer of vinyl chloride, they may be employed in particular copolymers of vinyl acetate and chloride advantageously containing at least 70% by weight of vinyl chloride. Some of these copolymers are sold under the commercial name "Lucovyl" by the French Company Pechiney-Saint-Gobain.

A polymer or copolymer of vinyl chloride having a value K higher than 60 is preferably employed.

In the process according to the invention, the binder is not first prepared as in the process described in the aforementioned French Pat. No. 1,575,668 and then mixed with the granulates in the mixer. Here, there is first effected a rapid mixture, generally within a period of the order of 5 to 20 seconds, of hot granulates with the polymer or copolymer in the mixer, after which the fluxed pitch or tar is added in the desired amounts and the mixing is terminated in the conventional manner, the total mixing time usually being of the order of 40 seconds to 90 seconds (including the mixture of the polymer with the granulates).

The polymer or copolymer is introduced in the granulates in the form of a powder having a particle size of less than 100 microns, and preferably between 2 and 10 microns.

A way of introducing the polymer or copolymer in the granulates in a particularly advantageous manner is to place the polymer in bags made from a sheet of plastics material, for example polyvinyl chloride or a copolymer of vinyl chloride, weigh the bags so as to have the desired amount of polymer and thereafter put the filled bags in the mixture where they are torn up, the contents thereof being then dispersed in the hot granulates.

This manner of proceeding has important advantages since it permits a good precision in the dosing of the polymer which plays a fundamental part in the characteristics of the coated product, which precision is otherwise rather difficult to achieve, bearing in mind the small amounts of polymer employed. Before introducing the polymer, the granulates were heated to a temperature between 120° and 160°C and preferably between 130° and 160°C.

After the rapid dry mixing of the granulates and polymer, the fluxed pitch or tar is introduced in the mixer and the mixing is continued under the usual conditions, for example for 30 to 60 seconds or more.

In the course of this stage, the fluxed pitch or tar encounters the particles of polymer which are dissolved therein, whereas the granulates, at the end of the mixing, are coated with a binder having the same properties as that obtained according to the process described in the aforementioned French Pat. No. 1,575,668.

The following examples are given by way of illustration of the invention, it being understood that the invention is not intended to be limited thereto.

EXAMPLE 1

The following mixture of aggregates is placed in pre-dosing machines, dried and heated in a drier to a temperature of 150°C and then put in a mixer at the coating station:

| Aggregates | |
|---|---|
| Gravel of 6 to 10 mm | 700 kg |
| Gravel of 2 to 6 mm | 420 kg |
| Crusher sand of 0 to 3 mm | 580 kg |
| River sand | 180 kg |
| Calcareous filler | 120 kg |

There are added to this mixture 7,200 kg of polyvinyl chloride powder having a K value of 78–81 which was previously dosed or measured out in a bag of polyvinyl chloride and has a particle size of 4 to 8 microns.

Mixing is carried out for 10 seconds and then 120 kg of cokery tar pitch of E.V.T. 42° are added. The mixing is carried out for a further 40 seconds. The preparation is then terminated and the coated product is ready to be spread over a road or an airport runway with the usual machine.

EXAMPLE 2

There are added to the following mixture of aggregates, heated to a temperature of between 140° and 160°C:

| | |
|---|---|
| Gravel of 6 to 12.5 mm | 120 kg |
| Gravel of 2 to 6 mm | 180 kg |
| Crusher sand (0 to 2 mm) | 260 kg |
| Round sand of 0.1 to 0.6 mm | 150 kg |
| Calcareous filler | 90 kg |

4.5 kg Of polyvinyl chloride having a K value of 78 to 81 and a particle size of 2 to 6 microns, contained in a bag of polyvinyl chloride, then, after 15 seconds of dry mixing, there are added 90 kg of cokery tar pitch of E.V.T. 35°. "Cokery tar pitch" is obtained by the distillation of the tar (obtained in stills at temperatures over 1.200°C), which is a by-product of the distillation of coal in coking plants.

Cokery tar pitch differs from the tar pitch obtained by distillation of tar with injection of water.

Cokery tar pitch is very rich in condensed hydrocarbons and this fact gives it very convenient solubilisation properties and compatibility regarding polyvinyl chloride.

After 40 seconds of additional mixing, the coated product is ready to be employed for sealing layers of dams or pumping stations where the exceptional properties of the binder, and in particular its flexibility at low temperatures, and its extremely high resistance to creep and shear, are particularly appreciated.

EXAMPLE 3

There are added to the following mixture of aggregates, heated to a temperature of between 140° and 160°C:

| | |
|---|---|
| Gravel of 8 to 25 mm | 400 kg |
| Gravel of 3 to 8 mm | 250 kg |
| Sand of 0 to 4 mm | 300 kg |
| Calcareous filler | 50 kg |

2,500 kg Of copolymer of vinyl acetate and chloride constituted by 92% of vinyl chloride and 8% of vinyl acetate, sold by the French Company Pechiney-Saint-Gobain under the trade name of "Lucovyl PA 1208". Its K value is about 70 and its particle size is 4 to 10 microns.

After 15 seconds of dry mixing, 50 kg of cokery tar pitch of E.V.T. 45° are injected.

The mixing is continued for a further 45 seconds and the coated product is ready for use.

Having now described my invention what I claim as new and desire to secure by Letters Patent is:

1. In a process for preparing a composition for the surface of roads, airport runways, canals, dams and like surfaces, by mixing in a mixer mineral granulates with 4 to 12% by weight, with respect to the weight of the granulates, of a binder consisting essentially of 93 to 96% by weight of a first component selected from fluxed coal pitch and fluxed coal tar and 4 to 7% by weight of a second component selected from a polymer of vinyl chloride and a copolymer of vinyl chloride, the improvement consisting of (a) mixing first in 5–20 sec. said second component in the form of a powder having a particle size of less than 100 microns with the granulates previously heated to a temperature between 120° and 160°C, (b) thereafter introducing said first component in the mixer in contact with the mixture thus obtained, and (c) further mixing the composition, the total mixing time of steps (a) and (c) being of from 40 sec. to 90 sec.

2. A process as claimed in claim 1, wherein said second component is a copolymer of vinyl chloride and vinyl acetate containing at least 70% by weight of vinyl chloride.

3. A process as claimed in claim 1, wherein the powder of said second component has a particle size of between 2 and 10 microns.

4. A process as claimed in claim 1, wherein the powder of said second component is introduced in the form of unit doses in bags of a plastic material selected from polyvinyl chloride polymer and copolymers.

5. A process as claimed in claim 1, wherein the granulates are heated to a temperature of between 130° and 160°C before the introduction of said second component.

* * * * *